(12) United States Patent
Kato

(10) Patent No.: US 6,277,184 B1
(45) Date of Patent: Aug. 21, 2001

(54) BLACK INK COMPOSITION FOR INK JET RECORDING

(75) Inventor: Shinichi Kato, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/388,724

(22) Filed: Sep. 2, 1999

(30) Foreign Application Priority Data

Nov. 20, 1998 (JP) .................................................. 10-331028
Jul. 2, 1999 (JP) .................................................. 11-189400

(51) Int. Cl.$^7$ .................................................. C09D 11/02
(52) U.S. Cl. .................................... 106/31.28; 106/31.52; 106/31.58
(58) Field of Search ............................. 106/31.28, 31.52, 106/31.58

(56) References Cited

U.S. PATENT DOCUMENTS

| | | | |
|---|---|---|---|
| 4,963,189 | 10/1990 | Hindagolla | 106/31.52 |
| 5,034,058 | 7/1991 | Akiyama | 106/31.52 |
| 5,053,495 | 10/1991 | Greenwood | 534/829 |
| 5,108,503 | 4/1992 | Hindagolla | 106/31.47 |
| 5,203,912 | 4/1993 | Greenwood | 106/31.52 |
| 5,478,384 | 12/1995 | Takimoto | 106/31.52 |
| 5,531,818 * | 7/1996 | Lin et al. | 106/31.28 |
| 5,604,276 | 2/1997 | Suga | 524/100 |
| 5,746,818 * | 5/1998 | Yatake | 106/31.28 |
| 5,891,227 * | 4/1999 | Hoffmann et al. | 106/31.28 |
| 5,993,524 * | 11/1999 | Nagai et al. | 106/31.58 |
| 6,004,389 * | 12/1999 | Yatake | 106/31.28 |

FOREIGN PATENT DOCUMENTS

| | | |
|---|---|---|
| 0441987 | 8/1991 | (EP) . |
| 0732382 | 9/1996 | (EP) . |
| 0761783 | 3/1997 | (EP) . |
| 04(1992)-183761 | 6/1992 | (JP) . |
| 05(1993)-26998 | 2/1993 | (JP) . |

OTHER PUBLICATIONS

JPO Abstract 04(1992)–183761, Jun. 30, 1992.
JPO Abstract 05(1993)–26998, Feb. 5, 1993.

* cited by examiner

*Primary Examiner*—Helene Klemanski
(74) *Attorney, Agent, or Firm*—Ladas & Parry

(57) ABSTRACT

Disclosed is a black ink composition for ink jet recording, comprising at least carbon black, a black dye, a water-soluble organic solvent, and water, the black dye being a black dye represented by formula (I), C.I. Direct Black 154, or C.I. Direct Black 168:

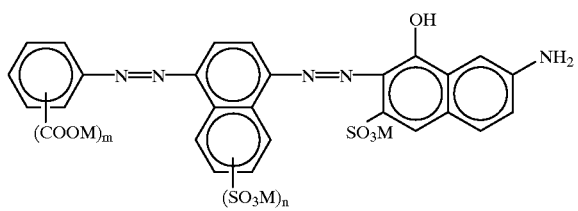

(I)

wherein M represents a cation of a group selected from the group consisting of a hydrogen atom, an alkali metal, ammonia, and an organic amine; m is 1 or 2; and n is 0 or 1.

4 Claims, No Drawings

BLACK INK COMPOSITION FOR INK JET RECORDING

BACKGROUND OF THE INVENTION

1. Field of the Invention

The present invention relates to a black ink composition for ink jet recording which can realize, even on plain papers, printed images having high quality and high color density and, at the same time, having excellent lightfastness and waterfastness.

2. Background Art

Ink jet recording is a printing method wherein droplets of an ink composition are ejected and deposited onto recording media, such as paper, to conduct printing. This method has a feature that images having high resolution and high quality can be printed at a high speed by means of relatively inexpensive apparatuses. In general, the ink composition used in the ink jet recording comprises water as a main component and, incorporated therein, a dye or a pigment as a colorant. and a wetting agent, such as glycerin, for preventing clogging and other purposes.

Further, in ink jet printers, good waterfastness and lightfastness are required of printed images from the viewpoint of enhancing the general-purpose properties of the ink jet printers. In order to improve the waterfastness of the printed images, Japanese Patent Laid-Open No.140495/1993 proposes an ink composition containing pyrrolidone which is 2-pyrrolidone, N-(2-hydroxyethyl)-2-pyrrolidone, or a mixture of 2-pyrrolidone with N-(2-hydroxyethyl)-2-pyrrolidone. Further, U.S. Pat. Nos. 4,963,189 and 5,203,912 disclose dyes which can be easily dissolved in bases, but are insoluble in water. These dyes have waterfastness which has been improved to some extent. However, there is still room for improvement in waterfastness. This is true of lightfastness.

Use of pigments as the colorant for satisfying both waterfastness and lightfastness requirements is well known in the art. In general, however, as compared with dyes, the pigments are likely to have inferior color development and to provide lower optical density.

In recent years, there is an increasing demand for high-speed printing. In order to realize high-speed printing, rapid fixation of ink onto recording media is necessary. This has lead to an attempt to improve the penetration of the ink into recording media. For example, Japanese Patent Laid-Open No. 183761/1992 and U.S. Pat. Nos. 5,156,675 and 5,183,502 disclose, for example, the addition of diethylene glycol monobutyl ether and the addition of a glycol ether in combination with a nonionic acetylene glycol surfactant.

In the highly penetrable ink using the pigment, however, the pigment to be stayed on the surface of the recording medium is more likely to be penetrated into the recording medium, due to the improved penetration, and to have poor color development. In particular, for plain papers not subjected to any special surface treatment (for example, copying papers, reporting papers, bond papers, letter papers, postcards, and slip sheets, used in offices, schools, households and the like), printed images were observed to have remarkably lowered optical density.

SUMMARY OF THE INVENTION

The present inventors have now found that use, as a colorant, of carbon black in combination with a specific black dye can realize printed images having high quality and high color density and, at the same time, having excellent lightfastness and waterfastness. More specifically, they have found that a combination of carbon black and a specific black dye in a specific weight ratio can realize an ink composition which can yield, even on plain papers, images having high quality (sharp images free from feathering) and high color density and can offer rapid ink fixation and can provide prints having excellent waterfastness and lightfastness. The present invention has been made based on such finding.

Accordingly, it is an object of the present invention to provide a black ink composition for ink jet recording which can realize, even on plain papers, printed images having high quality and high color density and, in addition, having excellent lightfastness and waterfastness.

Thus, according to the present invention, there is provided a black ink composition for ink jet recording, comprising at least carbon black, a black dye, a water-soluble organic solvent, and water, the black dye being a black dye represented by formula (I), C.I. Direct Black 154, or C.I. Direct Black 168:

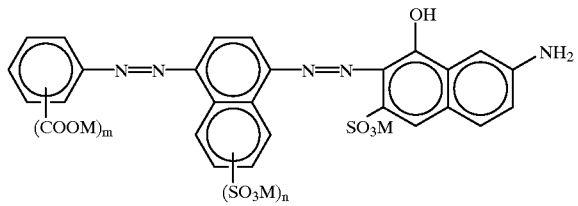

(I)

wherein M represents a cation of a group selected from the group consisting of a hydrogen atom, an alkali metal, ammonia, and an organic amine; m is 1 or 2; and n is 0 or 1.

According to a preferred embodiment of the present invention, in the black ink composition for ink jet recording, the weight ratio of the carbon black to the black dye is in the range of 2.5:1 to 7:1.

Further, according to a preferred embodiment of the present invention, in the black ink composition for ink jet recording, the water-soluble organic solvent is a polyhydric alcohol lower alkyl ether or an acetylene glycol represented by formula (II):

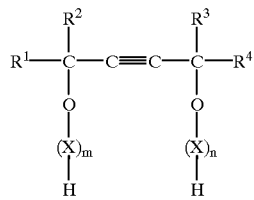

(II)

wherein X represents $CH_2$—$CH_2$—O, $R^1$, $R^2$, $R^3$, and $R^4$ each independently represent a $C_{1-6}$ alkyl group, and n+m is 0 to 30.

DESCRIPTION OF THE PREFERRED EMBODIMENTS

Ink Composition

According to the present invention, the black ink composition for ink jet recording basically comprises carbon black, a specific black dye, a water-soluble organic solvent, and water.

Carbon Black

Carbon blacks (C.I. Pigment Black 7) usable in the present invention include furnace black, lamp black, acetylene black, and channel black.

The content of the pigment, that is, carbon black, is preferably about 0.1 to 15% by weight, more preferably about 2 to 10% by weight, based on the ink composition.

According to a preferred embodiment of the present invention, the black pigment (carbon black) is added, to the ink, as a pigment dispersion prepared by dispersing the black pigment in an aqueous medium with the aid of a dispersant. Preferred dispersants include dispersants commonly used in the preparation of pigment dispersions, for example, polymeric dispersants and surfactants. Specific examples of polymeric dispersants usable herein include naturally occurring polymers and synthetic polymers. Among them, synthetic polymers are particularly preferred.

Representative examples of preferred synthetic polymers include: polyvinyl alcohols; polyvinyl pyrrolidones; acrylic resins, such as polyacrylic acid, acrylic acid/acrylonitrile copolymer, potassium acrylate/acrylonitrile copolymer, vinyl acetate/acrylic ester copolymer, and acrylic acid/alkyl acrylate copolymer; styrene/acrylic acid resins, such as styrene/acrylic acid copolymer, styrene/methacrylic acid copolymer, styrene/methacrylic acid/alkyl acrylate copolymer, styrene/α-methylstyrene/acrylic acid copolymer, and styrene/α-methylstyrene/acrylic acid/alkyl acrylate copolymer; styrene/maleic acid copolymer; styrene/maleic anhydric copolymer; vinyl naphthalene/acrylic acid copolymer; vinylnaphthalene/maleic acid copolymer; vinyl acetate copolymers, such as vinyl acetate/ethylene copolymer, vinyl acetate/fatty acid vinylethylene copolymer, vinyl acetate/maleic ester copolymer, vinyl acetate/crotonic acid copolymer, and vinyl acetate/acrylic acid copolymer; and salts of the above polymers. Among them, copolymers of monomers having a hydrophobic group with monomers having a hydrophilic group, and polymers comprising monomers having both hydrophobic and hydrophilic groups are particularly preferred. Examples of salts of the above polymers include salts of the above polymers with diethylamine, ammonia, ethylamine, triethylamine, propylamine, isopropylamine, dipropylamine, butylamine, isobutylamine, triethanolamine, diethanolamine, aminomethylpropanol, morpholine or the like. The weight average molecular weight of these copolymers is preferably 3,000 to 30,000, more preferably 5,000 to 15,000. According to the present invention, among the above polymers, styrene/acrylic acid resins, such as styrene/acrylic acid copolymer, styrene/methacrylic acid copolymer, styrene/methacrylic acid/alkyl acrylate copolymer, styrene/α-methylstyrene/acrylic acid copolymer, and styrene/α-methylstyrene/acrylic acid/alkyl acrylate copolymer or salts of these copolymers are preferred.

The content of the dispersant is 0.2 to 8% by weight, preferably 0.5 to 4% by weight, based on the ink composition.

Black Dye

According to the present invention, the black dye is represented by formula (I), C.I. Direct Black 154, or C.I. Direct Black 168:

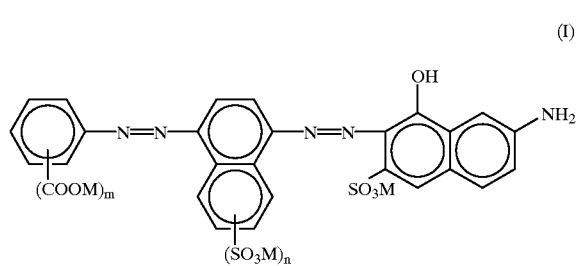

(I)

wherein M represents a cation of a group selected from the group consisting of a hydrogen atom, an alkali metal, ammonia, and an organic amine; m is 1 or 2; and n is 0 or 1.

According to a preferred embodiment of the present invention, the weight ratio of the carbon black to the black dye is preferably in the range of 2.5:1 to 7:1, more preferably in the range of 3:1 to 5:1. The above weight ratio range can offer excellent lightfastness and high print quality.

Black dyes represented by formula (I) used in the present invention are described in U.S. Pat. Nos. 4,963,189 and 5,203,912. They may be produced as described in the U.S. patents noted above. They may also be produced by methods described in Japanese Patent Laid-Open No. 140270/1990 and Colour Index, Third Edition, The society of Dyes and Colourists.

Specific examples of preferred black dyes represented by formula (I) are those wherein M represents a sodium or ammonium ion. More specific examples thereof include black dyes represented by formulae (III) to (VI):

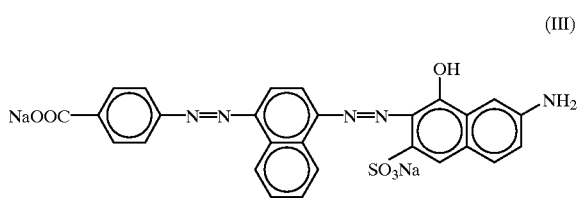

(III)

(IV)

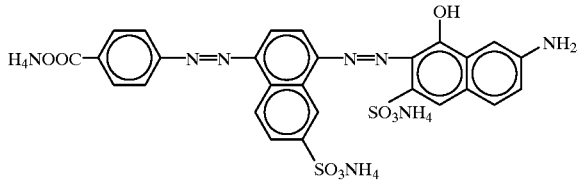

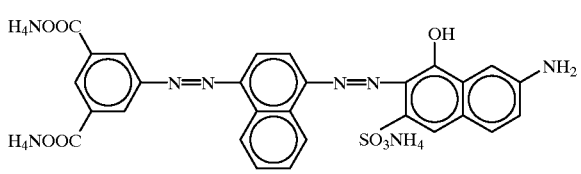

(V)

-continued

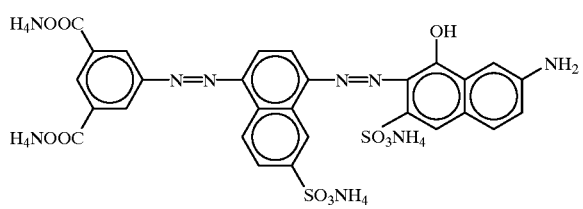
(VI)

Particularly preferred are a black dye represented by formula (V) which is a compound represented by formula (I) wherein M represents an ammonium ion, m is 2, and n is 0, and a black dye represented by formula (VI) which is a compound represented by formula (I) wherein M represents an ammonium ion, m is 2, and n is 1.

The black dye used in the present invention has high solubility in its basic state. Therefore, preferably, the pH value of the ink composition according to the present invention is adjusted so as to be rendered basic. According to a preferred embodiment of the present invention, the pH value of the ink composition is preferably in the range of 8.5 to 11, more preferably 8.5 to 10. pH adjustors usable herein include potassium hydroxide, sodium hydroxide, and triethanolamine.

C.I. Direct Black 154 or C.I. Direct Black 168 has surface active properties and, hence, when added to the ink, can markedly improve the wettability of head members and passage members made of glass, metals (nickel and stainless steel), plastics, photosensitive resins or the like. The heads and the passages can be easily filled with the ink without treatment of the heads and the passages, and, upon creation of air bubbles, they can be easily discharged, ensuring good ejection stability and reliability. Further, C.I. Direct Black 154 or C.I. Direct Black 168, when added to the ink, hardly changes the properties of the ink for ink jet recording (for example, viscosity, surface tension, pH, and wettability of paper by the ink), realizing high-quality printed letters and images free from feathering.

Water-Soluble Organic Solvent, Water, and Other Optional Components

The ink composition according to the present invention may be properly determined by taking recording methods and the like into consideration. Preferably, however, the ink composition basically comprises the colorant, water, and a water-soluble organic solvent.

According to a preferred embodiment of the present invention, the ink composition contains a polyhydric alcohol lower alkyl ether.

Specific examples of preferred polyhydric alcohol lower alkyl ethers usable herein include mono-, di- and triethylene glycol $C_{1-6}$ alkyl ethers and mono-, di-, and tripropylene glycol $C_{1-6}$ alkyl ethers, preferably triethylene glycol monobutyl ether, diethylene glycol monobutyl ether, diethylene glycol monoethyl ether, diethylene glycol monomethyl ether, propylene glycol monobutyl ether and the like, more preferably triethylene glycol monobutyl ether and diethylene glycol monobutyl ether.

The content of the polyhydric alcohol lower alkyl ether is preferably 2 to 12% by weight, more preferably 5 to 10% by weight, based on the ink composition.

According to a preferred embodiment of the present invention, the ink composition contains an acetylene glycol represented by formula (II). The acetylene glycol represented by formula (II) functions as a surfactant in the ink composition according to the present invention. Specific examples of preferred acetylene glycols represented by formula (II) usable herein are shown in the following table. Particularly preferred acetylene glycols are those represented by formula (II) wherein $R^1$ and $R^4$ each represent an iso-butyl group, $R^2$ and $R^3$ each represent a methyl group, and m+n is 0 to 30 with an acetylene glycol indicated as NO. 1 in Table 1 below being most preferred.

TABLE 1

|  | $R^1$ | $R^2$ | $R^3$ | $R^4$ | m + n |
|---|---|---|---|---|---|
| No. 1 | Iso-butyl | Methyl | Methyl | Iso-butyl | 10 |
| No. 2 | Iso-butyl | Methyl | Methyl | Iso-butyl | 3 |
| No. 3 | Ethyl | Methyl | Methyl | Ethyl | 10 |
| No. 4 | Methyl | Methyl | Methyl | Methyl | 0 |
| No. 5 | Ethyl | Methyl | Methyl | Ethyl | 0 |
| No. 6 | Iso-butyl | Methyl | Methyl | Iso-butyl | 0 |

Commercially available acetylene glycols may also be utilized, and examples thereof include Surfynol 440, 465, and 82, and TG (manufacturer: Air Products and Chemicals, Inc., selling agency: The Shin-Etsu Chemical Co., Ltd.).

The content of the acetylene glycol is preferably 0.1 to 1.2% by weight, more preferably 0.5 to 1% by weight.

Use of the polyhydric alcohol lower alkyl ether and the acetylene glycol in combination in the above respective content ranges can improve fast drying of the ink composition and can prevent a deterioration in print quality caused by feathering, color to color bleeding and the like. The polyhydric alcohol lower alkyl ether, when used alone, often attacks the resin constituting the recording head or the ink passage. However, use of the polyhydric alcohol lower alkyl ether in combination with the acetylene glycol can prevent the attack. The addition of a hydrophilic high-boiling low-volatile solvent, described below, in an amount of not less than 50% by weight to the polyhydric alcohol lower alkyl ether can further improve this effect.

Further, in the case of color printing, flow of dots to create color mixing between adjacent dots results in deteriorated quality of the formed color image. Use of the polyhydric alcohol lower alkyl ether in combination with the acetylene glycol can prevent the color mixing and can realize high-quality color images.

According to a preferred embodiment of the present invention, the ink composition contains an organic solvent. The organic solvent is preferably a low-boiling organic solvent, and preferred examples thereof include methanol, ethanol, n-propyl alcohol, iso-propyl alcohol, n-butanol, sec-butanol, tert-butanol, iso-butanol, and n-pentanol. Among them, monohydric alcohols are preferred. Low-boiling organic solvents have the effect of shortening the drying time of the ink.

Hydrophilic high-boiling low-volatile solvents usable herein include high-boiling low-volatile polyhydric alcohols, such as glycerin, ethylene glycol, diethylene glycol, triethylene glycol, propylene glycol, dipropylene glycol, hexylene glycol, polyethylene glycol, and polypropylene glycol. Further, other water-soluble organic solvents, for example, nitrogen-containing organic solvents, such as N-methyl-2-pyrrolidone, 1,3-dimethylimdazolidinone, monoethanolamine, N,N-dimethyletanolamine, N,N-diethylehtnaolamine, N-n-butyldiethanolamine, triisopropanolamine, and triethanolamine, may be added in such an amount range as will not create feathering of printed images. Among them, diethylene glycol, glycerin and the like are preferred.

These hydrophilic high-boiling low-volatile solvents are well known to be added as humectants for preventing clogging. The most prominent effect attained by the hydrophilic high-boiling low-volatile solvent when added to the ink composition according to the present invention is alleviation in the attack of the members. These hydrophilic high-boiling low-volatile solvents are well known to be added as humectants for preventing clogging. While a certain component of ink composition (particular, polyhydric alcohol lower alkyl ether) attacks and deteriorates the elements of printer which are in the contact with ink composition, the addition of the hydrophilic high-boiling low-volatile solvent can also alleviate the attack on the elements by the polyhydric alcohol lower alkyl ether.

The content of the humectant is preferably about 0.5 to 40% by weight, more preferably 2 to 20% by weight, based on the ink composition. The content of the low-boiling organic solvent is preferably about 0.5 to 10% by weight, more preferably 1.5 to 6% by weight, based on the ink composition.

If necessary, pH adjustors, preservatives, antimold and the like may also be added.

When the ink composition according to the present invention is used in ink jet recording, in order to realize good response, good ejection stability, a proper spread of dots, good roundness of dots and the like, the viscosity of the ink composition at a temperature of 0 to 50° C. during operation is preferably not more than 30 mPa.s, more preferably about 1.2 to 20 mpa.s, with the surface tension of the ink composition at a temperature of 0 to 50° C. during operation being preferably about 20 to 40 mN/m.

The most preferred black ink composition for ink jet recording according to the present invention comprises at least carbon black, a black dye represented by formula (V) and/or formula (VI), triethylene glycol monobutyl ether, an acetylene glycol represented by formula (II), glycerin, an ammonium salt of a styrene-acrylic acid copolymer, and water:

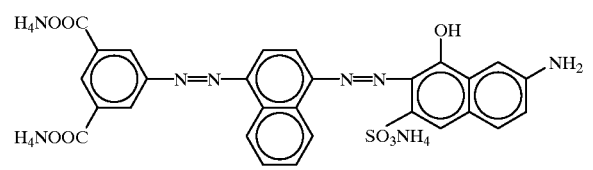

(V)

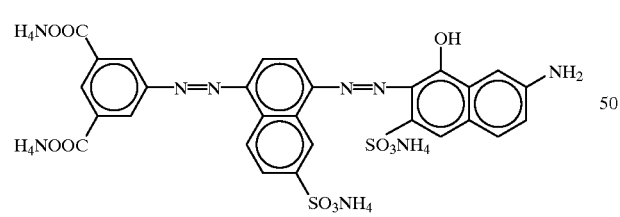

(VI)

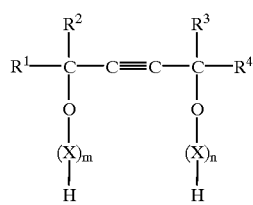

(II)

wherein X represents $CH_2$—$CH_2$—O, $R^1$ and $R^4$ each represent an iso-butyl group, $R^2$ and $R^3$ each represent a methyl group, and m+n is 0 to 30, the weight ratio of the carbon black to the black dye represented by formula (V) and/or formula (VI) being in the range of 2.5:1 to 7:1, the content of the triethylene glycol monobutyl ether being 2 to 12% by weight based on the ink composition, the content of the acetylene glycol represented by formula (II) being 0.5 to 1.2% by weight based on the ink composition, the content of glycerin being 2 to 20% by weight based on the ink composition, the content of the ammonium salt of the styrene-acrylic acid copolymer being 0.5 to 4% by weight based on the ink composition.

EXAMPLES

The following examples further illustrate the present invention, but are not intended to limit it.

Ink compositions were prepared according to the following formulations by a conventional method. Specifically, carbon black, together with the dispersant, was dispersed. The black dye and other ingredients were added thereto, followed by mixing. Insolubles having a certain or greater size were removed by filtration to prepare ink compositions.

Example A1

| | |
|---|---|
| Carbon black MA7 (manufactured by Mitsubishi Chemical Corporation) | 3.5 wt % |
| Dye of formula (VI) | 0.5 wt % |
| Ammonium salt of styrene/acrylic acid copolymer (molecular weight 7,000; dispersant) | 1.5 wt % |
| Glycerin | 10 wt % |
| Surfynol 465 | 1 wt % |
| Triethylene glycol monobutyl ether | 7 wt % |
| Proxel XL2 (Preservative, manufactured by ZENECA) | 0.3 wt % |
| Ion-exchanged water | Balance |

Example A2

| | |
|---|---|
| Carbon black Raven 1080 (manufactured by Columbian Carbon Co., Ltd.) | 2.5 wt % |
| Dye of formula (VI) | 1 wt % |
| Ammonium salt of styrene/acrylic acid copolymer (molecular weight 7,000; dispersant) | 1.5 wt % |
| Glycerin | 10 wt % |
| Surfynol 465 | 1 wt % |
| Triethylene glycol monobutyl ether | 7 wt % |
| Proxel XL2 (Preservative, manufactured by ZENECA) | 0.3 wt % |
| Ion-exchanged water | Balance |

Example A3

| | |
|---|---|
| Carbon black Raven 1080 (manufactured by Columbian Carbon Co., Ltd.) | 2.5 wt % |
| C.I. Direct Black 154 | 1 wt % |
| Ammonium salt of styrene/acrylic acid | 1.5 wt % |

-continued

| | |
|---|---|
| copolymer (molecular weight 7,000; dispersant) | |
| Glycerin | 10 wt % |
| Surfynol 465 | 1 wt % |
| Triethylene glycol monobutyl ether | 7 wt % |
| Proxel XL2 | 0.3 wt % |
| (Preservative, manufactured by ZENECA) | |
| Ion-exchanged water | Balance |

Example A4

| | |
|---|---|
| Carbon black Raven 1080 | 2.5 wt % |
| (manufactured by Columbian Carbon Co., Ltd.) | |
| C.I. Direct Black 168 | 0.5 wt % |
| Ammonium salt of styrene/acrylic acid | 1.5 wt % |
| copolymer (molecular weight 7,000; dispersant) | |
| Glycerin | 10 wt % |
| Surfynol 465 | 1 wt % |
| Triethylene glycol monobutyl ether | 7 wt % |
| Proxel XL2 | 0.3 wt % |
| (Preservative, manufactured by ZENECA) | |
| Ion-exchanged water | Balance |

Example B1

| | |
|---|---|
| Carbon black MA7 | 2.5 wt % |
| (manufactured by Mitsubishi Chemical Corporation) | |
| Dye of formula (VI) | 1.0 wt % |
| Ammonium salt of styrene/acrylic acid | 1.5 wt % |
| copolymer (molecular weight 7,000; dispersant) | |
| Glycerin | 10 wt % |
| Surfynol 465 | 1 wt % |
| Triethylene glycol monobutyl ether | 7 wt % |
| Proxel XL2 | 0.3 wt % |
| (Preservative, manufactured by ZENECA) | |
| Ion-exchanged water | Balance |

Example B2

| | |
|---|---|
| Carbon black MA7 | 2.5 wt % |
| (manufactured by Mitsubishi Chemical Corporation) | |
| Dye of formula (VI) | 0.5 wt % |
| Ammonium salt of styrene/acrylic acid | 1.5 wt % |
| copolymer (molecular weight 7,000; dispersant) | |
| Glycerin | 10 wt % |
| Surfynol 465 | 1 wt % |
| Triethylene glycol monobutyl ether | 7 wt % |
| Proxel XL2 | 0.3 wt % |
| (Preservative, manufactured by ZENECA) | |
| Ion-exchanged water | Balance |

Example B3

| | |
|---|---|
| Carbon black Raven 1080 | 3.5 wt % |
| (manufactured by Columbian Carbon Co., Ltd.) | |
| Dye of formula (VI) | 0.5 wt % |
| Ammonium salt of styrene/acrylic acid | 1.5 wt % |

-continued

| | |
|---|---|
| copolymer (molecular weight 7,000; dispersant) | |
| Glycerin | 10 wt % |
| Surfynol 465 | 1 wt % |
| Triethylene glycol monobutyl ether | 7 wt % |
| Proxel XL2 | 0.3 wt % |
| (Preservative, manufactured by ZENECA) | |
| Ion-exchanged water | Balance |

Example B4

| | |
|---|---|
| Carbon black MA7 | 4.0 wt % |
| (manufactured by Mitsubishi Chemical Corporation) | |
| Dye of formula (VI) | 2.0 wt % |
| Ammonium salt of styrene/acrylic acid | 0.5 wt % |
| copolymer (molecular weight 7,000; dispersant) | |
| Glycerin | 10 wt % |
| Surfynol 465 | 1 wt % |
| Triethylene glycol monobutyl ether | 7 wt % |
| Proxel XL2 | 0.3 wt % |
| (Preservative, manufactured by ZENECA) | |
| Ion-exchanged water | Balance |

Comparative Example 1

| | |
|---|---|
| Carbon black MA7 | 3.5 wt % |
| (manufactured by Mitsubishi Chemical Corporation) | |
| Ammonium salt of styrene/acrylic acid | 1.5 wt % |
| copolymer (molecular weight 7,000; dispersant) | |
| Glycerin | 10 wt % |
| Surfynol 465 | 1 wt % |
| Triethylene glycol monobutyl ether | 7 wt % |
| Proxel XL2 | 0.3 wt % |
| (Preservative, manufactured by ZENECA) | |
| Ion-exchanged water | Balance |

Comparative Example 2

| | |
|---|---|
| Dye of formula (VI) | 3.5 wt % |
| Glycerin | 10 wt % |
| Surfynol 465 | 1 wt % |
| Triethylene glycol monobutyl ether | 7 wt % |
| Proxel XL2 | 0.3 wt % |
| (Preservative, manufactured by ZENECA) | |
| Ion-exchanged water | Balance |

The surface tension of the above ink compositions was as summarized in Table 2.

TABLE 2

| | mN/m |
|---|---|
| Example. A1 | 33.0 |
| Example. A2 | 34.0 |
| Example. A3 | 31.3 |
| Example. A4 | 32.7 |
| Example. B1 | 34.2 |
| Example. B2 | 31.8 |
| Example. B3 | 33.0 |
| Example. B4 | 33.1 |

TABLE 2-continued

| | mN/m |
|---|---|
| Comp.Example.1 | 33.3 |
| Comp.Example.2 | 32.5 |

Print Evaluation Tests

The following print evaluation tests were carried out using an ink jet printer MJ-930C (tradename; manufactured by Seiko Epson Corporation) under conditions of resolution 720 dpi (dots/inch) and ink weight ejected 20 ng/dot. The following six types of papers were used in the evaluation tests.

Papers for Evaluation
① Xerox P (manufactured by Xerox Corp.)
② A Ricopy 6200 (manufactured by Ricoh Co., Ltd.)
③ Xerox 4024 3R 721 (manufactured by Xerox Corp.)
④ Neenah Bond (manufactured by Kimberly-Clark)
⑤ Xerox R (manufactured by Xerox Corp.)
⑥ Yamayuri (manufactured by Honshu Paper Co., Ltd.)

Evaluation 1: Print Quality

Alphabetical letters were printed on the above recording papers, and the prints were visually inspected for feathering. The results were evaluated according to the following criteria.
A: For all the papers, feathering hardly occurred.
B: For some of the papers, feathering slightly occurred.
C: For some of the papers, feathering occurred.
D: For all the papers, feathering occurred.

Evaluation 2: OD (Optical Density) Value

Graphics were printed on all the above recording papers, and the OD value of the blotted image portions was measured. The average of the OD values for the six papers was determined, and evaluated according to the following criteria. The OD value was determined by measuring the reflection density with Macbeth TR-927 manufactured by Macbeth.
A: Average OD value of not less than 1.30
B: Average OD value of 1.20 to less than 1.30
C: Average OD value of 1.10 to less than 1.20
D: Average OD value of less than 1.10

Evaluation 3: Waterfastness

Alphabetical letters were printed on all of the above recording papers. The print samples thus obtained were fully immersed in water for 5 min. Thereafter, the prints were air dried, and visually inspected. The results were evaluated according to the following criteria.
A: For all the papers, the legibility of the letters remained unchanged from the initial state.
B: For some of the papers, the letters were illegible.
C: For most of the papers, the letters were illegible.
D: For most of the papers, the letters were blurred and illegible.

Evaluation 4: Lightfastness

Blotted images were printed on papers ① and ②, and the prints were subjected to an accelerated light exposure test under the following conditions. The results were evaluated according to the following conditions.

Test Conditions

A xenon weather-o-meter Ci 35A (ATLAS) was provided, and the prints were exposed under conditions of black panel 63° C., relative humidity 50%, 340 nm ultraviolet radiation intensity 0.35 W/m$^2$, and irradiation time 500 hr.

Evaluation Criteria

The reflection density was measured with a spectrophotometer GRETAG SPM (GRETAG). The light source was D50, and no light source filter was used. Further conditions were white standard absolute white and angle of visibility 2°. The retention of density was determined. The results were evaluated according to the following criteria.
A: Retention exceeding 90%
B: Retention of 80 to less than 90%
C: Retention of less than 80%

The results of evaluation were as summarized in Table 3 below.

TABLE 3

| | Print quality | OD value | Water-fastness | Light-fastness |
|---|---|---|---|---|
| Example.A1 | A | A | A | A |
| Example. A2 | A | A | A | A |
| Example. A3 | A | B | B | B |
| Example. A4 | A | B | B | A |
| Example. B1 | A | A | A | A |
| Example. B2 | A | A | A | A |
| Example. B3 | A | A | A | A |
| Example. B4 | B | A | B | B |
| Comp.Example.1 | A | C | A | A |
| Comp.Example.2 | B | A | B | C |

What is claimed is:
1. A black ink composition for ink jet recording, comprising at least carbon black, a dispersant for dispersing the carbon black, a black dye represented by formula (V) and/or formula (VI), triethylene glycol monobutyl ether, an acetylene glycol represented by formula (II), glycerin, an ammonium salt for a styrene-acrylic acid copolymer, and water:

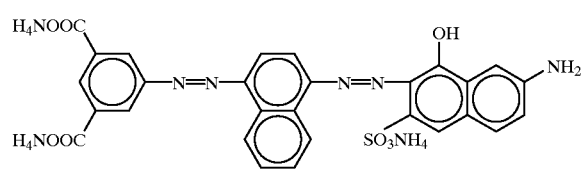
(V)

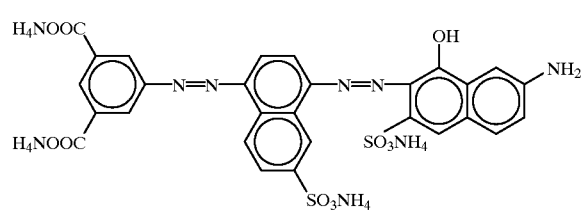
(VI)

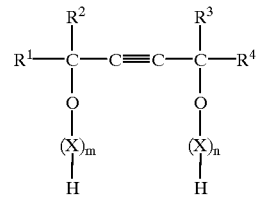
(II)

wherein X represents $CH_2—CH_2—O$, $R^1$ and $R^2$ each represent an iso-butyl group, $R^2$ and $R^3$ each represent a methyl group, and m+n is 0 to 30, the weight ratio of the carbon black to the black dye represented by formula (V) and/or formula (VI) being in the range of 2.5:1 to 7:1, the content of the triethylene glycol monobutyl ether being 2 to 12% by weight based on the ink composition, the content of the acetylene glycol represented by formula (II) being 0.5 to 1.2% by weight based on the ink composition, the content of glycerin being 2 to 20% by weight based on the ink composition, the content of the ammonium salt of the styrene-acrylic acid copolymer being 0.5 to 4% by weight based on the ink composition.

2. The ink composition according to claim 1, which has a surface tension of 20 to 40 mN/m at a temperature of 0 to 50° C.

3. An ink jet recording method utilizing the ink composition of claim 1 comprising the steps of: ejecting a droplet of said ink composition; and depositing the droplet onto a recording medium to perform printing.

4. A recording medium recorded by the ink jet recording method according to claim 3.

* * * * *